United States Patent
Nakagawa et al.

(10) Patent No.: US 12,253,121 B2
(45) Date of Patent: Mar. 18, 2025

(54) CAM CLUTCH

(71) Applicant: TSUBAKIMOTO CHAIN CO., Osaka (JP)

(72) Inventors: Eiichi Nakagawa, Osaka (JP); Yoshihito Shimanaka, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/503,301

(22) Filed: Nov. 7, 2023

(65) Prior Publication Data

US 2024/0068529 A1   Feb. 29, 2024

Related U.S. Application Data

(63) Continuation of application No. PCT/JP2022/016163, filed on Mar. 30, 2022.

(30) Foreign Application Priority Data

Jun. 8, 2021   (JP) .................................. 2021-095680

(51) Int. Cl.
  *F16D 41/07*   (2006.01)
  *F16D 41/06*   (2006.01)
  *F16D 41/08*   (2006.01)

(52) U.S. Cl.
  CPC ........... *F16D 41/07* (2013.01); *F16D 41/084* (2013.01); *F16D 2041/0603* (2013.01); *F16D 2041/0605* (2013.01)

(58) Field of Classification Search
  CPC .... F16D 2041/0603–0605; F16D 41/069–076; F16D 41/08;

(Continued)

(56) References Cited

U.S. PATENT DOCUMENTS 3,165,183 A * 1/1965 Clements ................ F16C 41/07
  192/105 R
5,343,992 A * 9/1994 Stark ..................... F16D 41/061
  192/93 C (Continued)

FOREIGN PATENT DOCUMENTS

JP   11-182589 A   7/1999
JP   2011-220509 A   11/2011

(Continued)

OTHER PUBLICATIONS

International Search Report dated Jun. 21, 2022, issued in counterpart International Application No. PCT/JP2022/016163. (2 pages).

(Continued)

*Primary Examiner* — James J Taylor, II
(74) *Attorney, Agent, or Firm* — WHDA, LLP

(57) ABSTRACT

To provide a cam clutch that allows use of the outer race as a rotating member without requiring a complex structure, and that allows a size reduction in the axial direction. The cam clutch includes an operating mode switch mechanism (140) for switching between two or more of a free state that allows relative rotation in both directions, a one-way clutch mode that allows relative rotation in one of forward and reverse directions, and a locked state that prohibits relative rotation in both directions. The operating mode switch mechanism (140) includes a cam orientation changing part (141) axially movable independently of rotation of the inner race (110) and the outer race (120). A plurality of cams (131) include an engaging portion (136) protruding from a side face toward the cam orientation changing part (141).

11 Claims, 4 Drawing Sheets

(58) Field of Classification Search
CPC ........... F16D 41/084–105; F16H 48/16; F16H 2048/208
See application file for complete search history.

(56) References Cited

U.S. PATENT DOCUMENTS

| | | | | |
|---|---|---|---|---|
| 5,971,123 | A | * | 10/1999 | Ochab .................. F16D 41/064 192/84.21 |
| 2014/0326565 | A1 | | 11/2014 | Iwano et al. |
| 2022/0056963 | A1 | | 2/2022 | Nakagawa et al. |
| 2022/0056965 | A1 | | 2/2022 | Kunimatsu et al. |

FOREIGN PATENT DOCUMENTS

| | | | |
|---|---|---|---|
| JP | 2011-231828 | A | 11/2011 |
| JP | 2014-219015 | A | 11/2014 |
| JP | 2020-190255 | A | 11/2020 |
| WO | 2020/235137 | A1 | 11/2020 |

OTHER PUBLICATIONS

Written Opinion of the International Searching Authority (Form PCT/ISA/237) dated Jun. 21, 2022, issued in counterpart International Application No. PCT/JP2022/016163. (3 pages).

\* cited by examiner

CAM CLUTCH

TECHNICAL FIELD

The present invention relates to a cam clutch with an operating mode switch mechanism for switching between two or more of a free state that allows relative rotation between an outer race and an inner race in both directions, a one-way clutch mode that allows relative rotation between the outer race and the inner race in either the forward or the reverse direction, and a locked state that prohibits relative rotation between the outer race and the inner race in both directions.

BACKGROUND ART

As one type of clutch that controls transmission and interruption of a rotary force, two-way switchable clutches that can drive and freewheel in both forward and reverse directions are known.

Some types of two-way clutches are configured to switch between a locked state that prohibits relative rotation between the inner race and the outer race (transmits the rotary force) and a free state that allows relative rotation between the inner race and the outer race (interrupts the rotary force) by tilting cams or sprags (see, for example, Patent Literature 1 and Patent Literature 2).

Patent Literature 3 describes a two-way clutch with a switch mechanism that can switch between three operating modes, i.e., two-way free mode, one-way lock mode, and two-way lock mode, by controlling a retainer that retains rollers or power transmission members either at a neutral position or at one engaged position on a cam surface formed on the inner circumference of the outer race.

CITATION LIST

Patent Literature

[Patent Literature 1] Japanese Patent Application Publication No. 2011-220509
[Patent Literature 2] Japanese Patent Application Publication No. H11-182589
[Patent Literature 3] Japanese Patent Application Publication No. 2014-219015
[Patent Literature 4] Japanese Patent Application Publication No. 2020-190255

SUMMARY OF INVENTION

Technical Problem

The two-way clutch described in Patent Literature 1 switches the states of engagement and separation between an input-side rotary member and an output-side rotary member by means of sprags that are tilted in the same direction as the rotation direction of the input-side rotary member when the input-side rotary member is rotated relative to the output-side rotary member. This poses the problem of poor responsiveness due to the time lost when the rotation direction is switched. The two-way clutch described in Patent Literature 2 entails the same problem.

The two-way clutch described in Patent Literature 3 uses plate spring members to allow power transmission in both directions. The problem with this two-way clutch, however, is that the torque the two-way clutch can transmit is small for its size because it relies on friction for the power transmission.

With a view to provide a cam clutch that solves these problems and is capable of switching from one operating mode to another with a simple structure and high responsiveness and of securing a desired torque capacity, the applicants invented a cam clutch with an operating mode switch mechanism presented in Patent Literature 4.

The cam clutch according to the first, second, and fourth embodiments described in Patent Literature 4 entailed an issue that a complex mechanism would be required to allow operation of the operating mode switch mechanism from the fixed side in an application where the outer race is used as a rotating member.

The cam clutch according to the third embodiment had issues that it required cams of a special shape, and that the cam clutch tended to be large in the axial direction.

The present invention solves these problems, and aims at providing a cam clutch capable of switching from one operating mode to another with a simple structure and high responsiveness and of securing a desired torque capacity, a cam clutch that allows use of the outer race as a rotating member without requiring a complex structure, and that allows a size reduction in the axial direction.

Solution to Problem

The present invention solves the above problems by providing a cam clutch including: at least one set of an inner race and an outer race that are coaxial and relatively rotatable; a plurality of cams circumferentially arranged between the inner race and the outer race; a biasing means radially biasing the plurality of cams; and an operating mode switch mechanism for switching between two or more of a free state that allows relative rotation between the outer race and the inner race in both directions, a one-way clutch mode that allows relative rotation between the outer race and the inner race in one of forward and reverse directions, and a locked state that prohibits relative rotation between the outer race and the inner race in both directions. The operating mode switch mechanism includes a cam orientation changing part axially movable independently of rotation of the inner race and the outer race. Some or all of the plurality of cams include an engaging portion protruding from a side face toward the cam orientation changing part.

Advantageous Effects of Invention

According to the invention set forth in claim 1, the cams with an engaging portion can be tilted to a predetermined direction only by axially moving the cam orientation changing part. Therefore, high responsiveness can be achieved in the switching of operating modes of the cam clutch. Since the clutch is a power transmission mechanism that uses cams, a desired torque capacity can be secured because there are no limitations set by frictional force on the transmissible torque capacity.

The cams are tilted as a result of a movement of the cam orientation changing part that restricts the radial position of the engaging portions of the cams, which prevents generation of noises, such as noises made by the cam orientation changing part and cams sliding each other, or the cams contacting the raceways in transition from the free state to the locked state. Since the cams make rolling contact with the raceways of the inner race and outer race, there is no slippage between the cams and the raceways. Therefore, wear caused by the freewheeling between the cams and the inner race or outer race can be prevented.

The operating mode switch mechanism is made up of a cam orientation changing part axially movable independently of rotation of the inner race and the outer race, and engaging portions protruding from a side face of the cams toward the cam orientation changing part. This makes it possible to use cams that are almost the same as conventional cams. No complex structure is required, and an axial size increase can be kept minimal even in the case where the outer race is used as a rotating member.

According to the configuration set forth in claim 2, the cams can be tilted by an axial movement of the cam orientation changing part. This allows the cams to be maintained in a desired orientation whenever even when the cams move circumferentially relative to the cam orientation changing part. Therefore, the operating modes can be switched over with a very simple structure even when the outer race is used as a rotating member.

According to the configuration set forth in claim 3, the first cams and the second cams are rotated in different directions to engage. This makes it possible to switch between four operating modes, i.e., a two-way free mode allowing rotation in both forward and reverse directions, one-way lock modes allowing rotation in either the forward direction or the reverse direction, and a two-way lock mode prohibiting rotation in both forward and reverse directions, by changing the orientation of one or both of the first cams and second cams.

According to the configuration set forth in claim 4, by providing one shared operating mode switch mechanism in the middle between the two sets of axially arranged cam clutch mechanisms, the number of components can be reduced, and the cam clutch structure can be simplified.

According to the configuration set forth in claim 5, by sharing the operation of the same operating mode switch mechanism, the number of components can be reduced, and the cam clutch structure can be simplified.

According to the configuration set forth in claim 6, the orientation of the first cams and second cams can be controlled by the same cam orientation changing part, which helps avoid an increase in complexity and size of the cam clutch structure.

Further, the invention according to claim 7 allows for selective control of the orientation of the first cams and the orientation of the second cams by the same cam orientation changing part shared by the first cams and second cams.

According to the configuration set forth in claim 8, a substantially high torque capacity can be secured while keeping an axial size increase minimal.

DESCRIPTION OF EMBODIMENTS

Embodiments of the present invention are described with reference to FIG. 1 to FIG. 9. Note, however, the present invention is not limited to these embodiments.

Embodiment 1

Figure 1:
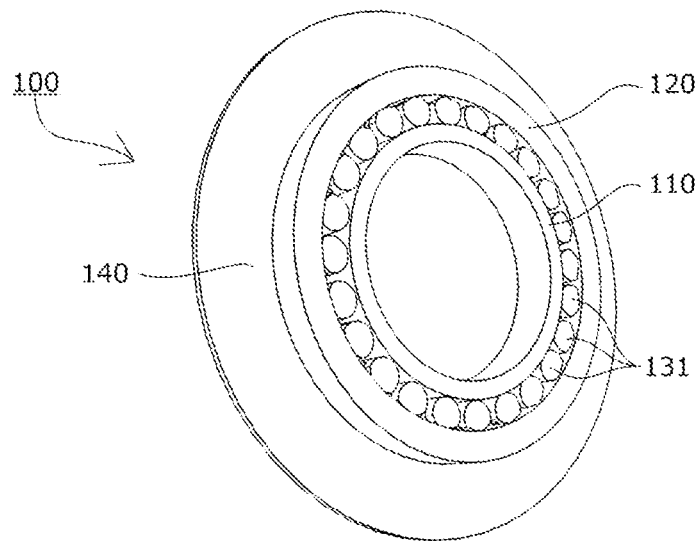
FIG. 1 is an exploded perspective view illustrating a configuration of a cam clutch according to a first embodiment of the present invention.
Figure 2:
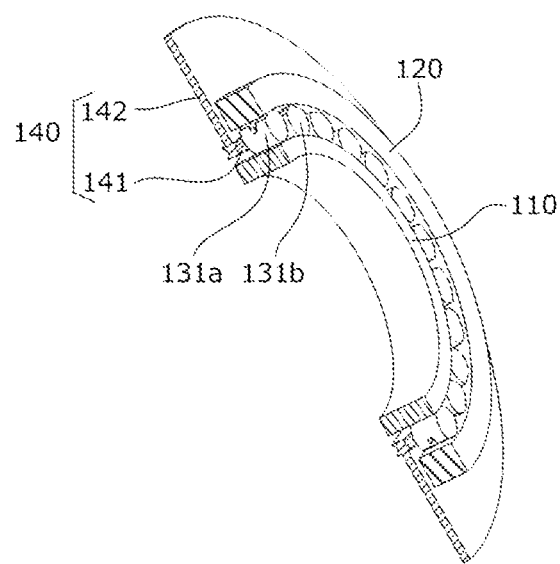
FIG. 2 is a cross-sectional view of a plane containing the center axis of the cam clutch shown in FIG. 1.

The cam clutch 100 according to the first embodiment of the present invention includes, as shown in FIG. 1 and FIG. 2, an inner race 110 and an outer race 120 provided on the same axis rotatably relative to each other, a cam mechanism disposed between an outer circumferential surface of the inner race 110 and an inner circumferential surface of the outer race 120 that face each other, and an operating mode switch mechanism 140 that switches the operating modes of the cam clutch 100.

The cam mechanism is made up of a plurality of cams 131 circumferentially aligned on the same circumference, and a biasing means (not shown) passed over the plurality of cams 131, set in respective retention grooves 132 of the cams, to bias the cams radially inwards. The cams 131 should preferably be disposed along the circumferential direction with little looseness. This configuration can realize a high torque transmission capacity.

The cam mechanism according to this embodiment includes first cams and second cams that rotate in different engaging directions. Below, the first and second cams may be referred to as cams 131 except when specifically mentioned separately.

Figure 5:
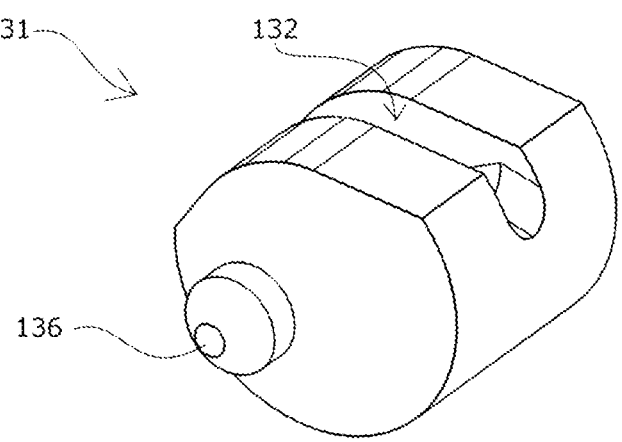
FIG. 5 is a perspective view of a cam in the cam clutch shown in FIG. 1.

As shown in FIG. 5, on one side face of the cam 131 is protruded an engaging portion 136 that can engage with the cam orientation changing part 141 of the operating mode switch mechanism 140.

Figure 3:
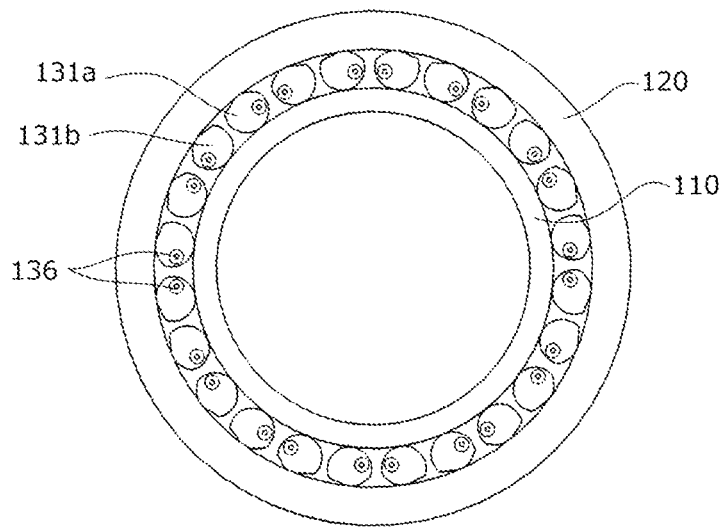
FIG. 3 is a plan view of the cam clutch shown in FIG. 1, in which the operating mode switch mechanism is omitted.

The arrangement of the first cams and second cams in the cam mechanism is not limited to a particular layout. Preferably, the first cams 131*a* and second cams 131*b* are arranged alternately, as illustrated in FIG. 3. This configuration allows control of the orientation of the first cams 131*a* and second cams 131*b* by the same operating mode switch mechanism 140 shared by the first cams 131*a* and second cams 131*b*, so that an increase in structural complexity or size of the cam clutch 100 can be avoided. It is also possible to control the orientation of the first cams 131*a* and second cams 131*b* simultaneously.

It is not necessary for the first cams 131*a* and second cams 131*b* to be arranged alternately on the same circumference. Therefore, the numbers of the first cams 131*a* and second cams 131*b* may be the same, or different.

The first cams 131*a* and second cams 131*b* have outer shapes that are identical to each other, for example, except that the engaging portion 136 is provided on different side faces, the first cams 131*a* reversed front to back being used as the second cams 131*b*. The first cams 131*a* and second cams 131b may have outer shapes that are different from each other. By having identical outer shapes, the number of parts can be reduced.

The first cam 131a is configured to make frictional engagement with the inner race 110 and outer race 120 when the outer race 120 rotates in one direction, and to tilt in the direction in which it separates from the inner race 110 and outer race 120 when the outer race 120 rotates in the other direction.

Therefore, the second cam 131b, which is the first cam 131a reversed front to back, is configured to make frictional engagement with the inner race 110 and outer race 120 when the outer race 120 rotates in the other direction, and to tilt in the direction in which it separates from the inner race 110 and outer race 120 when the outer race 120 rotates in one direction.

A ring-like garter spring, for example, is used as the biasing means (not shown). The garter spring is provided such as to pass through the respective retention grooves 132 in the first cams 131a and second cams 131b.

The biasing means may be any resilient member that can bias each of the plurality of cams 131 either radially inwards or outwards. A plurality of plate springs or torsion springs or the like may also be used.

The cam clutch 100 according to this embodiment includes an operating mode switch mechanism for switching between a free state that allows relative rotation between the inner race 110 and outer race 120 and a locked state that prohibits relative rotation between the inner race 110 and outer race 120.

The operating mode switch mechanism 140 of this embodiment includes a cam orientation changing part 141 that is provided such as to be axially movable independently of the rotation of the inner race 110 and outer race 120 to restrict the orientation of the cams 131.

Figure 4:
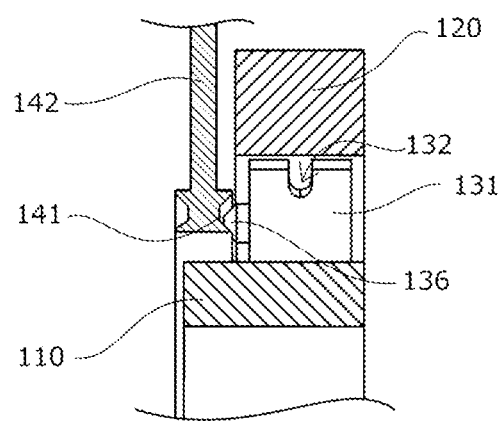
FIG. 4 is a partially enlarged view of the cross section shown in FIG. 2.
Figure 6:
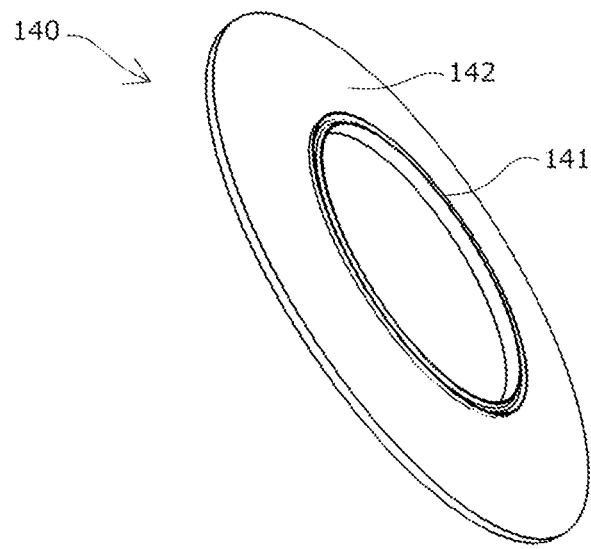
FIG. 6 is a perspective view of the operating mode switch mechanism shown in FIG. 1.

The operating mode switch mechanism 140 of this embodiment includes, as shown in FIGS. 2, 4, 6, etc., an annular plate-like main body 142 provided such as to be rotatable relative to the inner race 110 and outer race 120, and the cam orientation changing part 141 in a circular form provided on one side of the main body 142 facing the cams 131 such as to restrict the radial position of the engaging portions 136 while making sliding contact with the engaging portions 136, when coming into contact with the engaging portions 136 of the cams 131.

The cam orientation changing part 141 is configured to switchably lock and unlock the orientation of the cams 131 by an axial movement of the main body 142.

The engaging portion 136 is provided to such a position that the cams 131 can be brought to a condition not simultaneously touching the inner race 110 and outer race 120 when the radial position of the engaging portion 136 is changed by the cam orientation changing part 141, e.g., at a more peripheral side of the cam 131 than the perpendicular line on the contact point between the cam 131 and the inner race 110.

While the cam orientation changing part 141 in this embodiment is formed in a circular groove-like shape, the cam orientation changing part 141 may have any shape corresponding to the shape of the engaging portion 136, such as a single circular protruded portion on the radially inner side, as long as the cam orientation changing part 141 is able to lock and unlock the orientation of the cams 131.

In this embodiment, the main body 142 has an annular plate-like shape, with the cam orientation changing part 141 integrally formed therewith. As long as it is possible to move the cam orientation changing part 141 in the axial direction, the main body may have other shapes such as a lever, or may be formed as a separate part independently of the cam orientation changing part 141.

Moreover, bearing rollers and such may be arranged as required between the inner race 110 and the outer race 120 in addition to the first cams 131a and second cams 131b.

Hereinafter, the operation of the cam clutch 100 according to the above first embodiment will be described.

Here, it is assumed that the cam clutch is in the locked state where the outer race 120 is not allowed to rotate relative to the inner race 110 in both forward direction and the reverse direction when the cam orientation changing part 141 is in the position where it does not touch the engaging portions 136 and does not restrict the orientation of the cams 131. Namely, the cam clutch 100 functions as a two-way clutch.

When the main body 142 is moved toward the cams 131 manually or by a suitable drive source, the cam orientation changing part 141 engages with the engaging portions 136 and restricts the orientation of both cams 131a and 131b such that the cams 131a and 131b do not simultaneously contact the inner race 110 and outer race 120, which enables the cam clutch 100 to function in the free state that allows relative rotation in both directions.

In the above embodiment, the cams 131a and 131b are both provided for applications in opposite directions. Instead, the cam clutch may be configured to be switched between the one-way clutch mode and the free state by using only one set of the cams 131a or 131b.

Alternatively, the engaging portion 136 may be provided to only one set of the cams 131a or 131b. This way, the cam clutch can be configured to be switched between the locked state and the one-way clutch mode by a movement of the main body 142 to cause the cam orientation changing part 141 to engage with the engaging portions 136 of only one set of cams.

Figure 7:
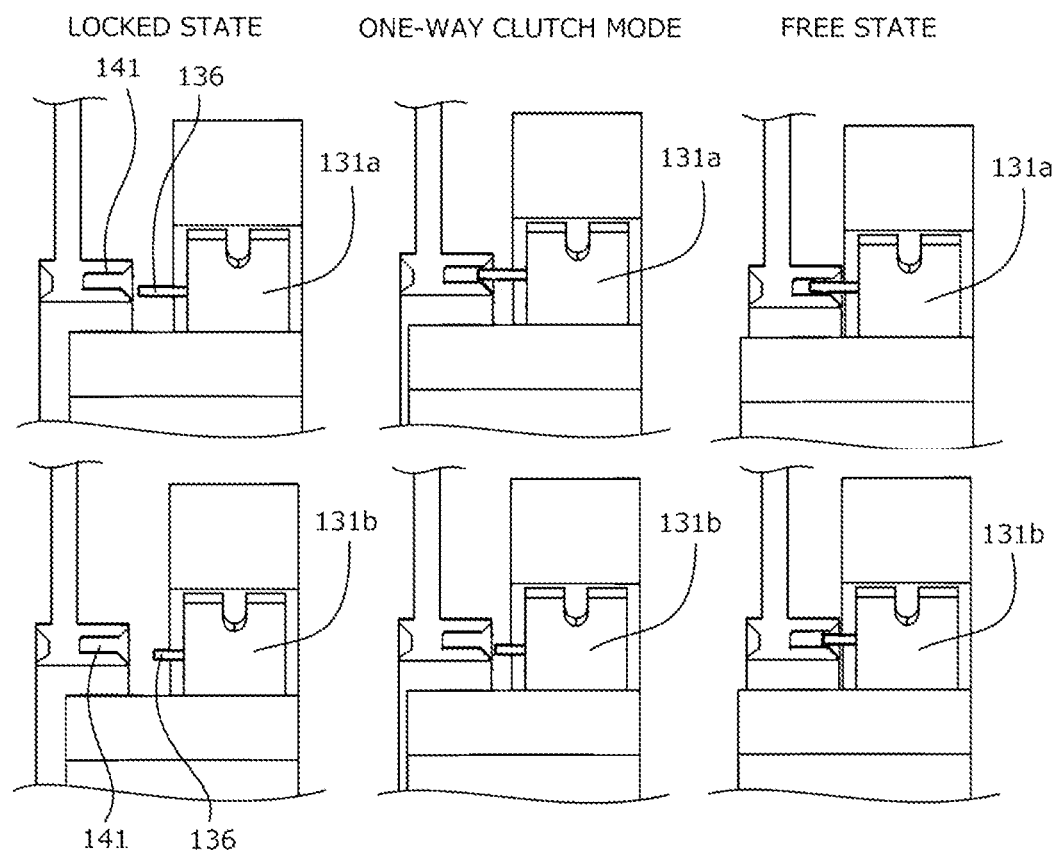
FIG. 7 is a schematic illustration of the shapes of the orientation changing part and the engaging portion in another form of the cam clutch according to the first embodiment of the present invention.

Further, as shown in FIG. 7, the groove of the cam orientation changing part 141 may be made deeper, and the engaging portions 136 of one set of cams 131a or 131b may be made longer and axially slidable inside the groove of the cam orientation changing part 141. By designing the cam orientation changing part 141 to be able to engage only with the longer ones of the engaging portions 136 of the cams 131a or 131b at a midway point of the axial movement of the cam orientation changing part 141, it is possible to configure the cam clutch to switch between three modes, the locked state, one-way clutch mode, and free state.

Embodiment 2

Figure 8:
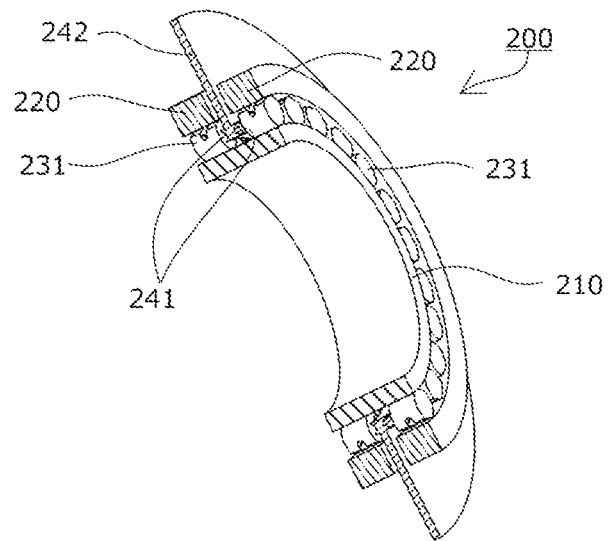
FIG. 8 is a cross-sectional view of a plane containing the center axis of a cam clutch according to a second embodiment of the present invention.

FIG. 8 is a cross-sectional view of a plane containing the center axis of the configuration of a cam clutch according to a second embodiment of the present invention.

This cam clutch 200 has cam mechanisms configured the same as the cam clutch 100 of the first embodiment arranged along the axial direction, with the main body 242 of the operating mode switch mechanism 240 being shared in the center.

The operating mode switch mechanism 240 includes the main body 242 that is an annular plate provided such as to be rotatable relative to the inner race 210 and two outer races 220, and cam orientation changing parts 241 in a circular shape on both sides of the main body 242 corresponding to the cams 231 on both sides.

In this cam clutch 200, the operating mode switch mechanism 240 is designed to switch between three positions, a position where neither of the cam orientation changing parts 241 on both sides engages with the engaging portions 236 of the cams 231 on both sides, a position where one cam orientation changing part 241 engages with the engaging portions 236, and a position where the other cam orientation changing part 241 engages with the engaging portions 236.

Therefore, by moving the main body 242 in the axial direction manually or by a suitable drive source, the cam clutch can be switched from one to another of three operating modes, a neutral position where the clutch mechanisms on both sides are locked, a position where only one of them is in the free state where relative rotation is allowed in both directions while the other is in the locked state, and a position where this is reversed.

The neutral position may be omitted so that the cam clutch is switched between two operating modes.

The cam mechanisms on both sides of the operating mode switch mechanism 240 may each be configured to have any of the switching functions illustrated in the first embodiment, or different types of cam mechanisms may be combined as required.

For example, with cam mechanisms of the design shown in FIG. 7 on both sides, the cam clutch can be switched to five operating modes.

The shape and structure of the main body 242 may be changed to make the cam orientation changing parts 241 on both sides axially movable independently, so that the cam orientation changing parts 241 can engage with the engaging portions 236 simultaneously in the clutch mechanisms on both sides.

Embodiment 3

Figure 9:
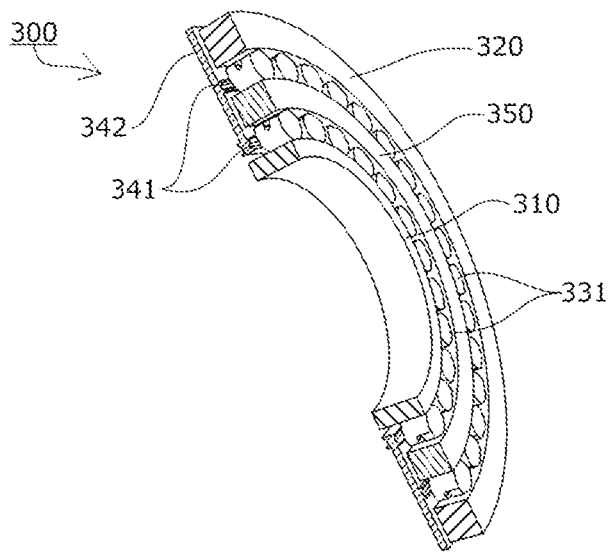
FIG. 9 is a cross-sectional view of a plane containing the center axis of a cam clutch according to a third embodiment of the present invention.

FIG. 9 is a cross-sectional view of a plane containing the center axis of the configuration of a cam clutch according to a third embodiment of the present invention.

This cam clutch 300 has two cam mechanisms configured the same as the cam clutch 100 of the first embodiment in a double structure, with an inner clutch mechanism arranged between the inner race 310 and an intermediate race 350, and an outer clutch mechanism arranged between the intermediate race 350 and the outer race 320.

The intermediate race 350 serves as the outer race in the inner clutch mechanism, and as the inner race in the outer clutch mechanism.

The operating mode switch mechanism 340 includes a main body 342 that is an annular plate provided such as to be rotatable relative to the inner race 310, intermediate race 350, and outer race 320, and two cam orientation changing parts 341 in a circular shape on one side of the main body 342 facing the cams 331, corresponding to the inner and outer rows of cams 331.

In this cam clutch 300, the inner and outer cam orientation changing parts 341 of the operating mode switch mechanism 340 and the engaging portions 336 of the inner and outer rows of cams 331 respectively have the same relationship as that in the cam clutch 100 of the first embodiment.

The two cam mechanisms may each be configured to have any of the switching functions illustrated in the first embodiment, or different types of cam mechanisms may be combined as required.

The groove depths of the inner and outer cam orientation changing parts 341 and the lengths of the respective engaging portions 336 of the inner and outer rows of cams 331 may be combined as required to make the cam clutch switchable between a plurality of modes corresponding to the axial movement positions.

Further, the shape and structure of the main body 342 may be changed to make the inner and outer cam orientation changing parts 341 axially moveable independently, so that the modes of the inner and outer cam mechanisms can be controlled independently.

While embodiments of the present invention have been described in detail, the present invention is not limited to the above-described embodiments and may be carried out with various design changes without departing from the scope of the present invention set forth in the claims.

REFERENCE SIGNS LIST 100, 200, 300 Cam clutch
110, 210, 310 Inner race
120, 220, 320 Outer race
131, 231, 331 Cam
131a First cam
131b Second cam
132 Retention groove
136 Engaging portion
140, 240, 340 Operating mode switch mechanism
141, 241, 341 Cam orientation changing part
142, 242, 342 Main body
350 Intermediate race

The invention claimed is:

1. A cam clutch comprising:
at least one set of an inner race and an outer race that are coaxial and relatively rotatable;
a plurality of cams circumferentially arranged between the inner race and the outer race;
a biasing means radially biasing the plurality of cams; and
an operating mode switch mechanism for switching between two or more of a free state that allows relative rotation between the outer race and the inner race in both forward and reverse directions, a one-way clutch mode that allows relative rotation between the outer race and the inner race in one of the forward and reverse directions, and a locked state that prohibits relative rotation between the outer race and the inner race in both of the forward and reverse directions,
the operating mode switch mechanism including a cam orientation changing part axially movable independently of rotation of the inner race and the outer race,
some or all of the plurality of cams including an engaging portion protruding from a side face toward the cam orientation changing part,
wherein the cam orientation changing part is provided in a circular shape such as to restrict a radial position of the engaging portions while making sliding contact with the engaging portions, when having come into contact with the engaging portions.

2. The cam clutch according to claim 1, wherein the plurality of cams include first cams that tilt to make frictional engagement with the outer race and the inner race when the outer race or the inner race rotates in one of the forward and reverse directions, and second cams that tilt to make frictional engagement with the outer race and the inner race when the outer race or the inner race rotates in the other of the forward and reverse directions.

3. The cam clutch according to claim 2, wherein the at least one set of the outer race and the inner race includes at least two sets of the outer race and the inner race,
one set of the at least two sets of the outer race and the inner race is coaxially provided with another set of the at least two sets of the outer race and the inner race at different diameters.

4. The cam clutch according to claim 1, wherein the at least one set of the outer race and the inner race includes at least two sets of the outer race and the inner race,
- one set of the at least two sets of the outer race and the inner race is disposed axially on one side of the operating mode switch mechanism, and
- another set of the at least two sets of the outer race and the inner race is disposed axially on another side of the operating mode switch mechanism.

5. The cam clutch according to claim 4, wherein the plurality of cams include first cams that tilt to make frictional engagement with the outer race and the inner race when the outer race or the inner race rotates in one of the forward and reverse directions, and second cams that tilt to make frictional engagement with the outer race and the inner race when the outer race or the inner race rotates in the other of the forward and reverse directions,
- wherein the first cams are provided between the outer race and the inner race of the one set of the at least two sets of the outer race, and
- the second cams are provided between the outer race and the inner race of the another set of the at least two sets of the outer race and the inner race.

6. The cam clutch according to claim 4, wherein the plurality of cams include first cams that tilt to make frictional engagement with the outer race and the inner race of the one set when the outer race or the inner race rotates in one of the forward and reverse directions, and second cams that tilt to make frictional engagement with the outer race and the inner race of the another set when the outer race or the inner race rotates in the other of the forward and reverse directions, and
- wherein the first cams and the second cams are arranged on a same circumference.

7. The cam clutch according to claim 6, wherein the first cams and the second cams are arranged alternately.

8. A cam clutch comprising:
- at least one set of an inner race and an outer race that are coaxial and relatively rotatable;
- a plurality of cams circumferentially arranged between the inner race and the outer race;
- a biasing means radially biasing the plurality of cams; and
- an operating mode switch mechanism for switching between two or more of a free state that allows relative rotation between the outer race and the inner race in both forward and reverse directions, a one-way clutch mode that allows relative rotation between the outer race and the inner race in one of the forward and reverse directions, and a locked state that prohibits relative rotation between the outer race and the inner race in both of the forward and reverse directions,
- the operating mode switch mechanism including a cam orientation changing part axially movable independently of rotation of the inner race and the outer race,
- some or all of the plurality of cams including an engaging portion protruding from a side face toward the cam orientation changing part,
- wherein the at least one set of the outer race and the inner race includes at least two sets of the outer race and the inner race,
- one set of the at least two sets of the outer race and the inner race is disposed axially on one side of the operating mode switch mechanism, and
- another set of the at least two sets of the outer race and the inner race is disposed axially on another side of the operating mode switch mechanism.

9. The cam clutch according to claim 8, wherein the plurality of cams include first cams that tilt to make frictional engagement with the outer race and the inner race when the outer race or the inner race rotates in one of the forward and reverse directions, and second cams that tilt to make frictional engagement with the outer race and the inner race when the outer race or the inner race rotates in the other of the forward and reverse directions,
- wherein the first cams are provided between the outer race and the inner race of the one set of the at least two sets of the outer race and the inner race, and
- the second cams are provided between the outer race and the inner race of the another set of the at least two sets of the outer race and the inner race.

10. The cam clutch according to claim 8, wherein the plurality of cams include first cams that tilt to make frictional engagement with the outer race and the inner race of the one set when the outer race or the inner race rotates in one of the forward and reverse directions, and second cams that tilt to make frictional engagement with the outer race and the inner race of the another set when the outer race or the inner race rotates in the other of the forward and reverse directions, and
- wherein the first cams and the second cams are arranged on a same circumference.

11. The cam clutch according to claim 10, wherein the first cams and the second cams are arranged alternately.

* * * * *